W. McK. LAMBDIN.
UNIVERSAL HOUSEHOLD GRATER.
APPLICATION FILED DEC. 13, 1921.

1,411,634.

Patented Apr. 4, 1922.

Witness
Curtis Greene

Inventor
William McKendree Lambdin

UNITED STATES PATENT OFFICE.

WILLIAM McKENDREE LAMBDIN, OF WACO, TEXAS.

UNIVERSAL HOUSEHOLD GRATER.

1,411,634.   Specification of Letters Patent.   Patented Apr. 4, 1922.

Application filed December 13, 1921. Serial No. 522,028.

*To all whom it may concern:*

Be it known that I, WILLIAM McKENDREE LAMBDIN, a citizen of the United States, residing at Waco, in the county of McLennan and State of Texas, have invented a new and useful Universal Household Grater, of which the following is a specification.

My invention relates to an improvement in the method of grating various substances such as cocoanut, cheese, chocolate, vegetables, etc., by hand.

In the machine which I have invented, I have eliminated the necessity of holding the substance being grated between the fingers and rubbing it back and forth over the grater surface, with the attendant possibility of a slip and resultant injury to the fingers.

I attain these objects by means of the mechanism illustrated in the accompanying drawing, in which—

Figure 3:
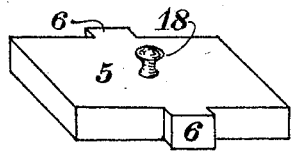
Figure 2:
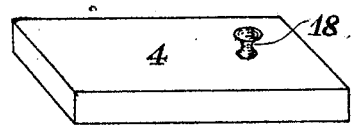
Figure 4:
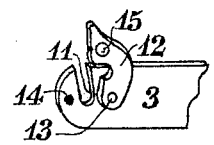
Figure 1:
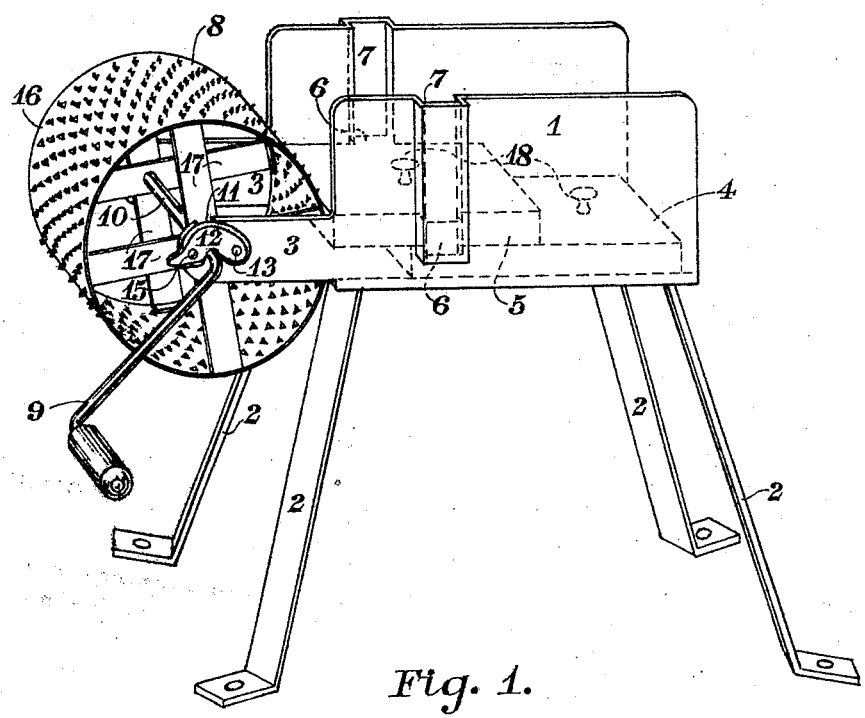

Figure 1 is a projection of the entire machine; Figure 2 a projection of the feeder block; Figure 3 a projection of the holder block; Figure 4 a projection of one of the grater roller brackets with movable catch open; and Figure 5 an enlarged detail of a part of the grating surface of the grater roller.

Similar numerals refer to similar views throughout the several drawings.

The grater body box 1 with its legs 2 and grater roller brackets 3, rigidly attached, constitute the framework of the machine. The substance to be grated is placed in the forward end of the grater body box and the feeder block 4 is placed in position behind it. The holder block 5, which has on each side of it a lug 6, fitting in a groove 7, in the grater body box, is then dropped into place on top of both the substances to be grated and the feeder block, and holds them in position by hand pressure, as the feeder block is pushed forward by the fingers of the same hand, thus feeding the substance forward and against the grater roller 8 which is revolved by a crank and handle 9, turned by the other hand. The shaft 10 of the grater roller, is a continuation of the crank 9, and rests in a deep notch 11 in each of the grater roller brackets.

Catch 12 revolves on a pivot 13 and is locked in place by a projecting tit 14, which fits into the round indentation 15 in the catch when the latter is pressed down holding the grater roller shaft securely in position, but may be raised by an upward pressure on its free end, allowing the grater roller to be lifted from the brackets.

Figure 5:
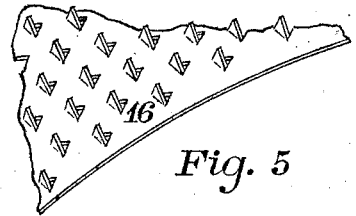

The grater roller 8 consists of a cylindrical piece of stiff metal 16 with triangular projections punched through in close, staggered rows and so arranged that no two projections in near proximity will come in contact with the substance to be grated at the same point and forming the grating surface as shown on an enlarged scale in Fig. 5 of the drawing. The metal cylinder 16 is attached to the shaft 10 by the metal strips 17 which are soldered or welded to the metal cylinder 16, to the shaft 10 and to each other, and may be of any form and number serving the purpose of holding the metal cylinder 16 rigidly in place. Castings of suitable form may take the place of strips 17. A solidly enclosed cylinder with the toothed grating surface and rigidly attached to shaft 10 may take the place of parts 16 and 17.

A hand knob 18 is attached to the feeder block and to the holder block to facilitate handling or lifting out; the knob on the feeder block is so placed as to limit forward motion of block and prevent its touching the grater roller surface.

The legs 2 of the grater body box are of such form as to give the machine stability, by affording a broad base, while at the same time allowing space for a receptacle to be placed under the grater to catch the grated material.

I claim:

The combination of a grater frame together with feeder block and holding block with lugs sliding in vertical grooves in grater frame, forming the feeding mechanism; with a grater roller consisting of a cylindrical grating surface mounted upon a shaft and carried by the grater frame, with a crank and handle attached.

WILLIAM McKENDREE LAMBDIN.